United States Patent
Kniaz et al.

(10) Patent No.: US 8,200,531 B2
(45) Date of Patent: Jun. 12, 2012

(54) DETERMINING COMPLEMENTARY PRODUCT CONTENT FROM PRIMARY PRODUCT DOCUMENT INFORMATION AND PROVIDING SUCH COMPLEMENTARY PRODUCT CONTENT IN ASSOCIATION WITH THE PRIMARY PRODUCT DOCUMENT, IN AN ONLINE ENVIRONMENT

(75) Inventors: Robert Kniaz, London (GB); Jonathan Steinback, London (GB)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/952,545

(22) Filed: Nov. 23, 2010

(65) Prior Publication Data

US 2011/0071897 A1  Mar. 24, 2011

Related U.S. Application Data

(62) Division of application No. 12/124,425, filed on May 21, 2008.

(51) Int. Cl.
*G06Q 30/00* (2012.01)
(52) U.S. Cl. .......................... 705/14; 705/26
(58) Field of Classification Search .................. 705/26, 705/16, 71; 707/101
See application file for complete search history.

(56) References Cited

U.S. PATENT DOCUMENTS

| | | | |
|---|---|---|---|
| 7,136,875 B2 | 11/2006 | Anderson et al. | |
| 7,430,561 B2* | 9/2008 | Bailey et al. | 1/1 |
| 7,716,161 B2 | 5/2010 | Dean et al. | |
| 7,848,960 B2 | 12/2010 | Rampell et al. | |
| 2003/0204444 A1* | 10/2003 | Van Luchene et al. | 705/16 |
| 2006/0224464 A1* | 10/2006 | Walker et al. | 705/26 |
| 2008/0010120 A1 | 1/2008 | Chung et al. | |
| 2008/0091546 A1* | 4/2008 | Kirovski et al. | 705/26 |
| 2008/0140577 A1* | 6/2008 | Rahman et al. | 705/71 |

FOREIGN PATENT DOCUMENTS

| | | |
|---|---|---|
| JP | 2002259447 A | 9/2002 |
| KR | 20000012721 A | 3/2000 |
| KR | 20010108578 A | 12/2001 |
| WO | 2001071683 A2 | 9/2001 |

OTHER PUBLICATIONS

International Search Report, PCT/US2009/044882, dated Dec. 17, 2009.

* cited by examiner

*Primary Examiner* — Samica L Norman
(74) *Attorney, Agent, or Firm* — Lerner, David, Littenberg, Krumholz & Mentlik, LLP (57) ABSTRACT

When purchasing a product or service from an online merchant ("first merchant"), e-commerce consumers might want to purchase a complementary product and/or service not offered by the first merchant. Such consumers are provided with an opportunity to purchase or otherwise learn about such complementary products and/or services, and secondary merchants are provided with the opportunity to sell or market such complimentary products and/or services in a way that would not jeopardize the first merchant's sale, and indeed, in a way that might provide a benefit to the first merchant.

11 Claims, 9 Drawing Sheets

DETERMINING COMPLEMENTARY PRODUCT CONTENT FROM PRIMARY PRODUCT DOCUMENT INFORMATION AND PROVIDING SUCH COMPLEMENTARY PRODUCT CONTENT IN ASSOCIATION WITH THE PRIMARY PRODUCT DOCUMENT, IN AN ONLINE ENVIRONMENT

CROSS-REFERENCE TO RELATED APPLICATIONS

This application is a divisional of U.S. application Ser. No. 12/124,425, filed on May 21, 2008, the disclosure of which is hereby incorporated herein by reference.

BACKGROUND OF THE INVENTION

1. Field of the Invention

The present invention concerns providing product information in an online environment. In particular, the present invention concerns determining complementary product content from primary product document information and providing such complementary product content in association with the primary product document, in an online environment.

2. Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as an effective way to advertise and influence users. Interactive advertising provides opportunities for advertisers to target their ads to a receptive audience. That is, targeted ads are more likely to be useful to end users since the ads may be relevant to a need inferred from some user activity (e.g., relevant to a user's search query to a search engine, relevant to content in a document requested by the user, etc.). Query keyword targeting has been used by search engines to deliver relevant ads. For example, the AdWords™ advertising system by Google, Inc. of Mountain View, Calif. (referred to as "Google"), delivers ads targeted to keywords from search queries. Similarly, content targeted ad delivery systems have been proposed. For example, U.S. patent application Ser. No. 10/314,427 (incorporated herein by reference and referred to as "the '427 application"), titled "METHODS AND APPARATUS FOR SERVING RELEVANT ADVERTISEMENTS", filed on Dec. 6, 2002 and listing Jeffrey A. Dean, Georges R. Harik and Paul Buchheit as inventors; and Ser. No. 10/375,900 (incorporated by reference and referred to as "the '900 application"), titled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal and Narayanan Shivakumar as inventors, describe methods and apparatus for serving ads relevant to the content of a document, such as a Web page for example. Content targeted ad delivery systems, such as the AdSense™ advertising system by Google for example, have been used to serve ads on Web pages.

As can be appreciated from the foregoing, serving ads relevant to concepts of text in a text document and serving ads relevant to keywords in a search query are useful because such ads presumably concern a current user interest. Consequently, such online advertising has become increasingly popular.

Businesses are increasingly incorporating e-commerce methods in their overall business strategies. E-commerce (e.g., electronic commerce) involves the buying, selling and advertising of goods and services on the Internet. Similarly, e-commerce enabled advertising systems have been proposed. For example, U.S. patent application Ser. No. 11/424,516 (incorporated herein by reference and referred to as "the '516 application"), titled "ECOMMERCE-ENABLED ADVERTISING," filed on Jun. 15, 2006 and listing David Chung as the inventor describes methods and apparatus for serving e-commerce enabled ads relevant to the content of a document, such as a Web page for example.

When purchasing a product or service from an online merchant ("the primary merchant"), e-commerce consumers might want to purchase a complementary product and/or service not offered by the merchant. Thus, it would be useful to (1) provide such consumers with an opportunity to purchase such complementary products and/or services, and (2) provide secondary merchants with the opportunity to sell such complimentary products and/or services. However, the primary merchant will not want to jeopardize its own sale to such a consumer. Thus, it would be useful to provide such consumers with an opportunity to purchase such complementary products and/or services in a way that would not jeopardize the primary merchant's sale, and indeed, in a way that might provide a benefit to the primary merchant.

SUMMARY OF THE INVENTION

Embodiments consistent with the present invention can be used to generate and provide complementary product content, in an online advertising network. For example, at least some embodiments consistent with the present invention (1) provide consumers with an opportunity to purchase or otherwise learn about complementary products and/or services, and (2) provide secondary merchants with the opportunity to sell or market such complimentary products and/or services in a way that would not jeopardize the first merchant's sale. Such embodiments might do so by (a) accepting a first document of a first merchant pertaining to a first product, (b) accepting information related to a plurality of secondary products from a plurality of secondary merchants, (c) determining scores for each of the plurality of secondary products from a plurality of secondary merchants, wherein each of the scores is a function of at least one of (i) whether or not the first merchant sells the secondary product, (ii) whether or not the first merchant has the secondary product in inventory, (iii) whether the first merchant can ship the secondary product, (iv) when the first merchant can ship the secondary product, (v) whether the secondary merchant has been identified as a merchant to be blocked by the first merchant, and (vi) whether the secondary product has been identified as a product to be blocked by the first merchant, and (d) controlling whether and how to serve content pertaining to each of the plurality of secondary products from the plurality of secondary merchants based on the respective scores.

At least some embodiments consistent with the present invention can be used to generate and provide complementary product content, in an online advertising network. At least some such embodiments might do so by (a) accepting a first document of a first merchant pertaining to a first product, wherein the first document is one of (A) a check-out document, and (B) a post check-out document, (b) determining, using information from the accepted first document, content pertaining to a second product from a second merchant different from the first merchant, and (c) serving the determined content for rendering in association with the first document on a client device.

DETAILED DESCRIPTION

The present invention may involve novel methods, apparatus, message formats, and/or data structures for determining and providing complementary product (and/or service) content in an online environment. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

In the following, definitions of terms that may be used in the specification are provided in §4.1. Then, environments in which, or with which, embodiments consistent with the present invention may operate are described in §4.2. Exemplary embodiments consistent with the present invention are described in §4.3. Thereafter, specific examples illustrating uses of exemplary embodiments of the present invention are provided in §4.4. Finally, some conclusions regarding the present invention are set forth in §4.5.

Definitions

Online ads may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet, another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, online games, etc.), offline content (e.g., a newspaper, a magazine, a theatrical production, a concert, a sports event, etc.), and/or offline objects (e.g., a billboard, a stadium score board, and outfield wall, the side of truck trailer, etc.). Properties with content (e.g., magazines, newspapers, Websites, email messages, etc.) may be referred to as "media properties." Although properties may themselves be offline, pertinent information about a property (e.g., attribute (s), topic(s), concept(s), category(ies), keyword(s), relevancy information, type(s) of ads supported, etc.) may be available online. For example, an outdoor jazz music festival may have entered into an advertising system the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a Realnetworks streaming audio file player, etc.), a viewer (e.g., an Abobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner. A "document publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Figure 1:
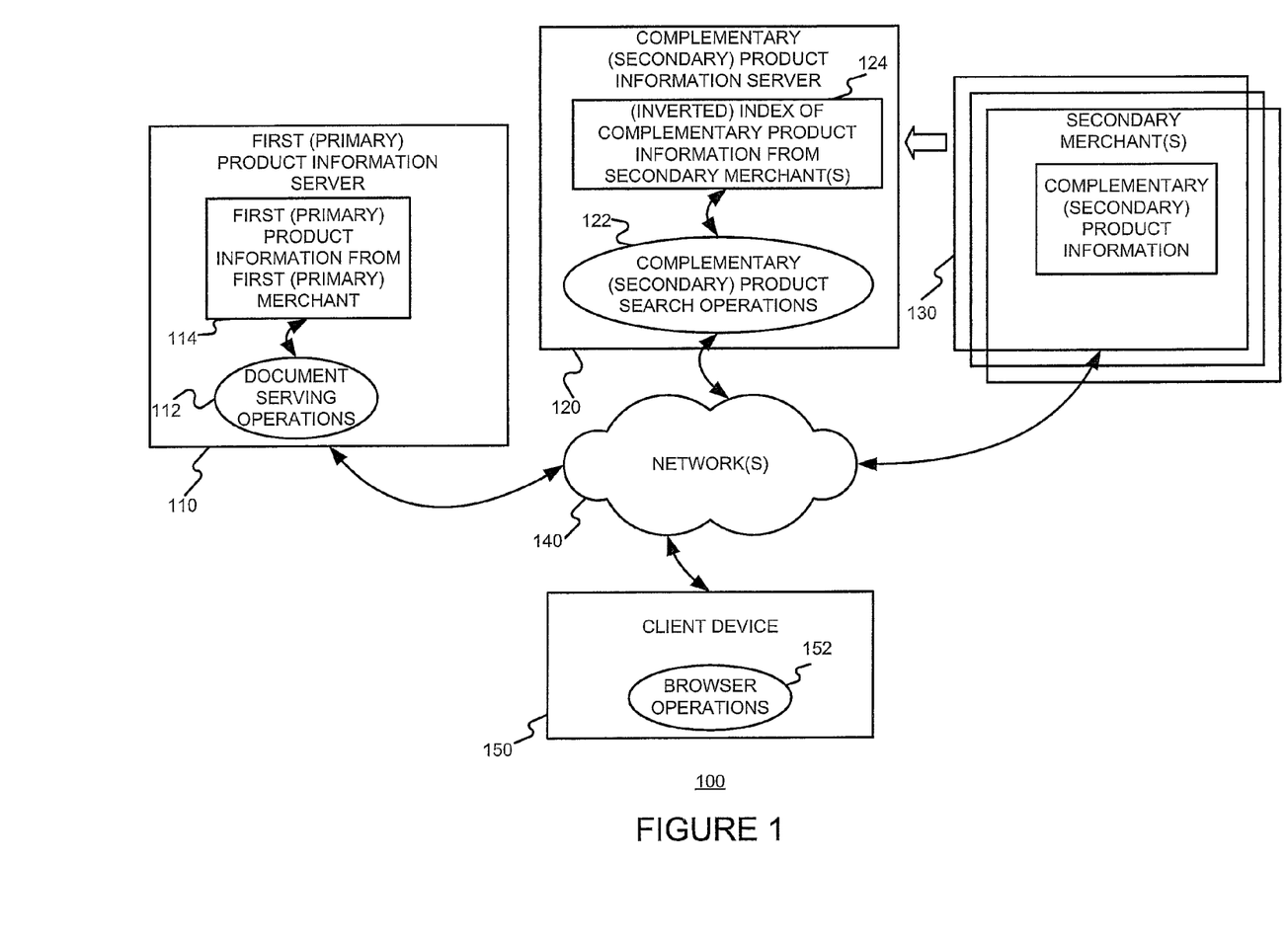
FIG. 1 is a diagram illustrating an environment in which, or with which, embodiments consistent with the present invention may operate.

Exemplary Environments in which, or with which, Embodiments Consistent with the Present Invention may Operate FIG. 1 illustrates an exemplary environment 100 in which embodiments consistent with the present invention may be used. The environment 100 includes a first (primary) product information server 110, a complementary (secondary) product information server 120, secondary merchant information servers 130, a client device 150 and one or more networks(s) 140. Networks(s) 140 may be used to interconnect the various servers (110,120) and devices (130,150) described above. Such network(s) 140 may illustratively include the Internet and/or private networks.

A client device (also referred to as a "client" or "user device") 150 may include a browser facility (such as the Explorer browser from Microsoft, the Opera Web Browser from Opera Software of Norway, the Navigator browser from AOLITime Warner, the Firefox browser from Mozilla, etc.) performing browser operations 152, an e-mail facility (e.g., Outlook from Microsoft) (not shown), etc.

A first (e.g., primary) product information server 110 may contain first (e.g., primary) product information (e.g., on a Web page) from a first (e.g., primary) merchant 114. Document serving operations 112 may send first product content to the client device (e.g., browser) 150 via one or more network(s) 140. The first product information server 110 may receive and/or index the first product information.

A complementary (e.g., secondary) product information server 120 includes complementary (secondary) product search operations 122 which use information about the first (e.g., primary) product (e.g., as query information) to search an index (e.g., an inverted index) of complementary product information 124 from one or more other (secondary) merchants (e.g., advertisers) 130. Complementary product content (e.g., advertisements) determined to be pertinent to the first (primary) product may be scored and ranked. At least some of the complementary product content may then forwarded, via the one or more networks 140, to the client device 150 for rendering to the user (e.g., to be displayed by a browser).

Complementary product search operations 122 may determine complementary product content (e.g., ads) to be served in association with primary product content using techniques described in the '900 application to target ads to documents. The complementary product content might be e-commerce enabled ads, such as those described in the '516 application.

The request for complementary product content provided to the complementary product search operations 122 may also include document information such as, for example, the document itself (e.g., a product Web page, a payment page, a shipping confirmation page, etc.), a category or topic corresponding to the first product, a name of the first product, geo-location information, time information, etc.

The first product information server 110 may combine the requested first (primary) product content with one or more of the complementary product content provided by the complementary product search operations 120. This combined information may be forwarded, via network(s) 140, to the client device 150 that requested the first (primary) product content, for presentation to the user. Although the foregoing example described the first (primary) product information server 110 as (i) requesting complementary product content, and (ii) combining it with first (primary) product document, one or both of these operations may be performed by another device, such as the client device 150 for example. Alternatively, the complementary product information server 120 may combine the first (primary) product document and the complementary product content.

Exemplary Embodiments Consistent with the Present Invention

Embodiments consistent with the present invention can be used to determine and provide complementary product content from first (primary) product information, in an online environment. Exemplary methods consistent with the present invention are described in §4.3.1. Then, exemplary apparatus consistent with the present invention are described in §4.3.2. Finally, refinements, alternatives and extensions are described in §4.3.3.

Exemplary Methods

Figure 2:
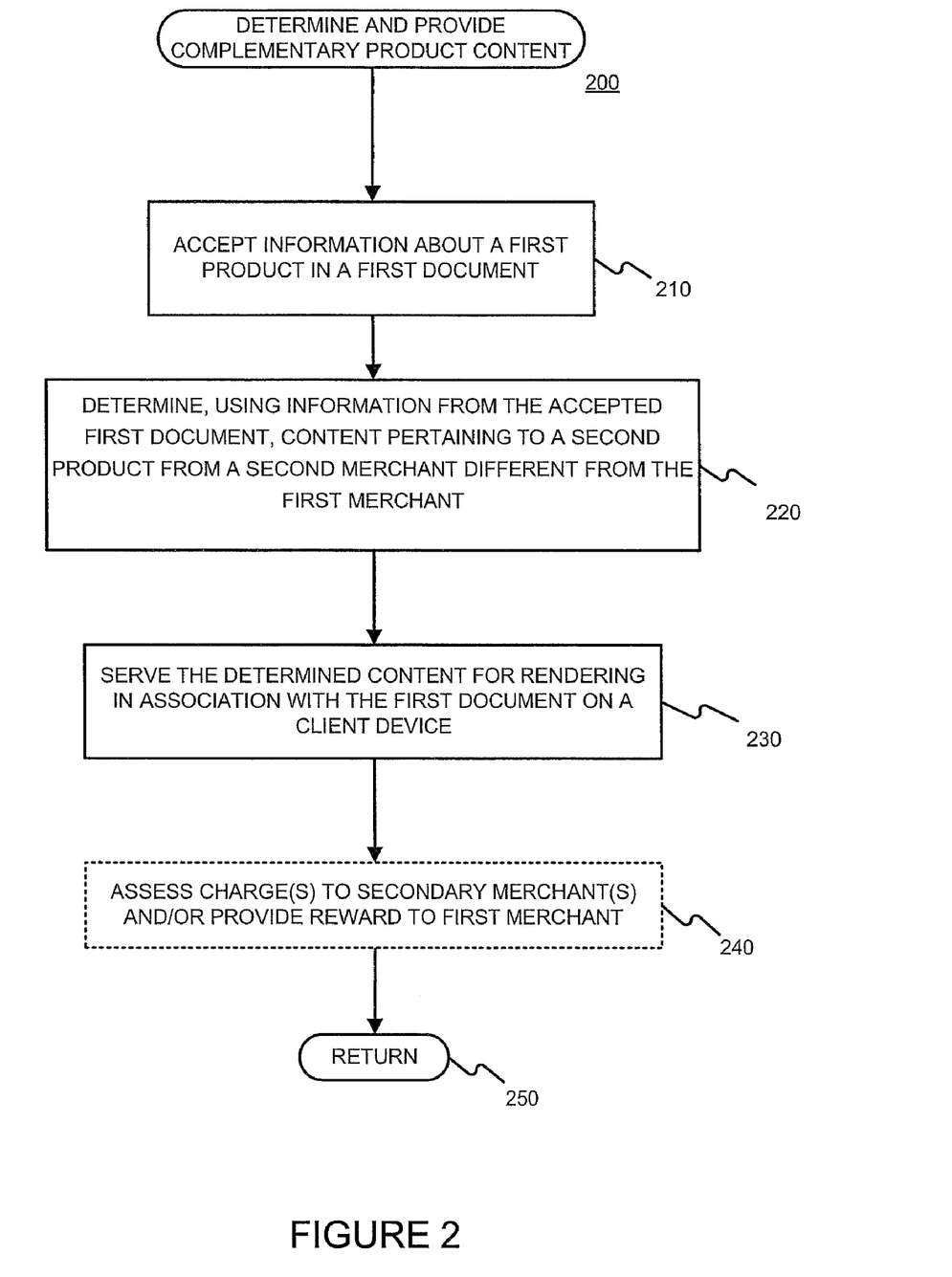
FIG. 2 is a flow diagram illustrating an exemplary method for determining and serving complementary product (and/or service) content, in a manner consistent with the present invention.

FIG. 2 is a flow diagram illustrating an exemplary method 200 for determining and serving complementary (secondary) product content in a manner consistent with the present invention. Information about a first product of a first merchant in a first document is accepted. (Block 210). Subsequently, using the first product information from the first document, complementary (secondary) product content (e.g., an advertisement, such as an e-commerce enabled advertisement) from a secondary merchant may be determined. (Block 220) The complementary (secondary) product content from the secondary merchant is different from the first (primary) product associated with the first merchant. Similarly, the secondary merchant is different from the first merchant. The determined complementary (secondary) product content from the secondary merchant is then served to a client device (e.g., browser facility of a personal computer, mobile telephone, PDA, etc.) and rendered in association with the first document. (Block 230) Charges may be assessed to the secondary merchant, and rewards may be provided to the first merchant. (Block 240) The method 200 is then left. (Node 250)

Referring back to block 210, the first document may be a product information document, a checkout document, a post check-out document (e.g., an order confirmation document, a shipment notification document, a payment confirmation document), etc.

Referring back to block 220, the complementary (secondary) product content might be determined by (1) extracting first product information from the first document, and (2) using that first product information as a search query to search an (inverted) index of complementary (secondary) product content from one or more secondary merchants. Alternatively, the complementary (secondary) product content might be determined by (1) extracting information about the first product from the first document, and (2) determining searches related to searches for the first product from a product search Website (e.g., Froogle). Alternatively, the complementary (secondary) product content might be determined by (1) extracting information about the first product from the first document, and (2) determining related products from product vertical categories. Alternatively, the complementary (secondary) product content might be determined by (1) extracting information about the first product from the first document, and (2) determining related products from advertiser ads. In any case, the complementary (secondary) product content might be an advertisement.

Figure 3:
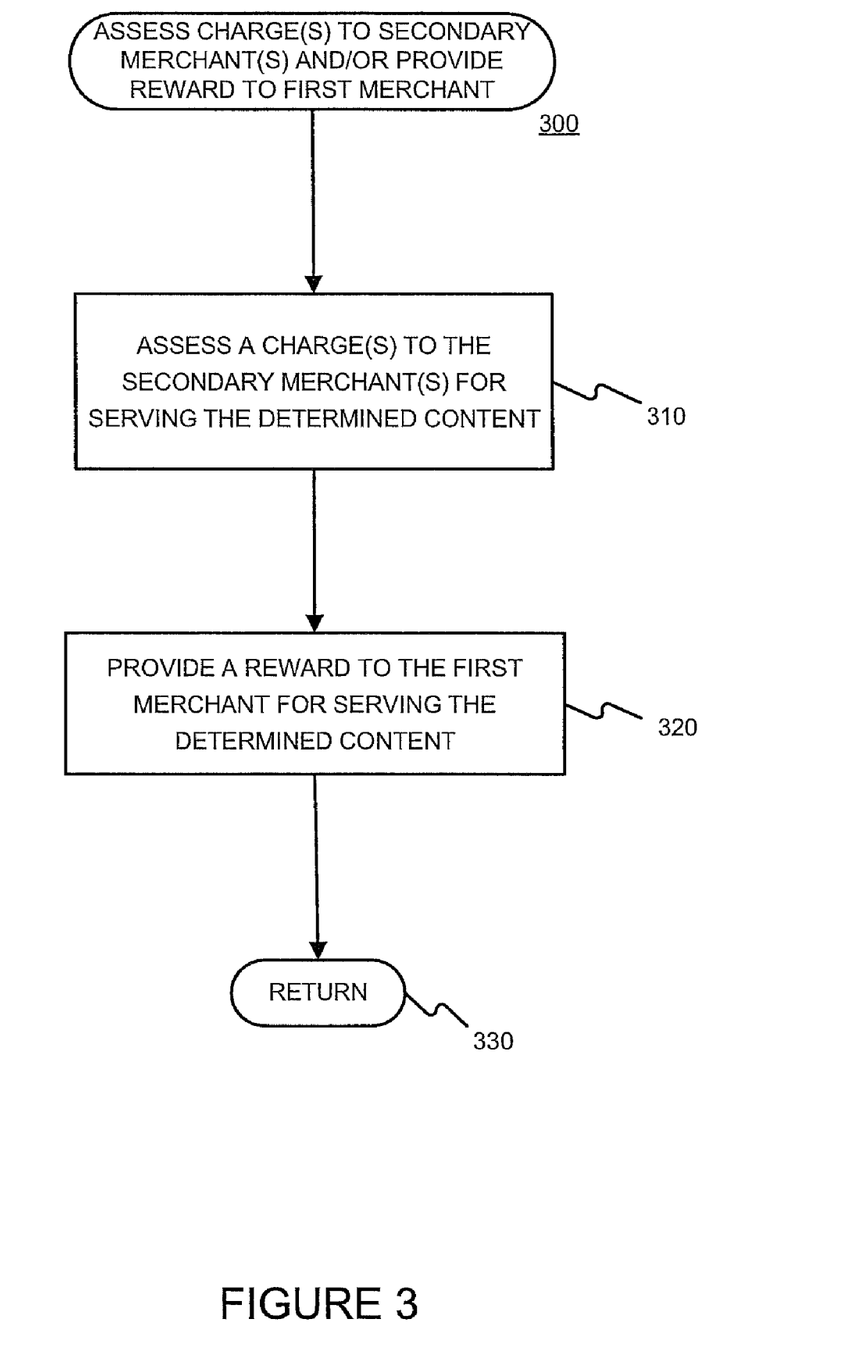
FIGS. 3 and 4 are flow diagrams illustrating exemplary methods for assessing charges and providing rewards for providing complementary product (and/or service) content with a document, in a manner consistent with the present invention.

FIG. 3 is a flow diagram illustrating an exemplary method 300 for assessing charges (e.g., fees) and rewards (e.g., compensation), in a manner consistent with the present invention. After the complementary (secondary) product content from a secondary merchant has been served to the user device (as described above with reference to FIG. 2), a charge (e.g., a predetermined fee, etc.) may be assessed to the secondary merchant. (Block 310) A reward (e.g., financial compensation, credit, etc.) may be provided to the first merchant. (Block 320) The method 300 is left. (Node 330) The reward provided to the first merchant is preferably less than the charge assessed to the secondary merchant. If a plurality of complimentary (secondary) product content from one or more secondary merchants was provided, a charge may be assessed for each of the pieces of complimentary (secondary) product content to a corresponding one of the one or more secondary merchants.

Figure 4:
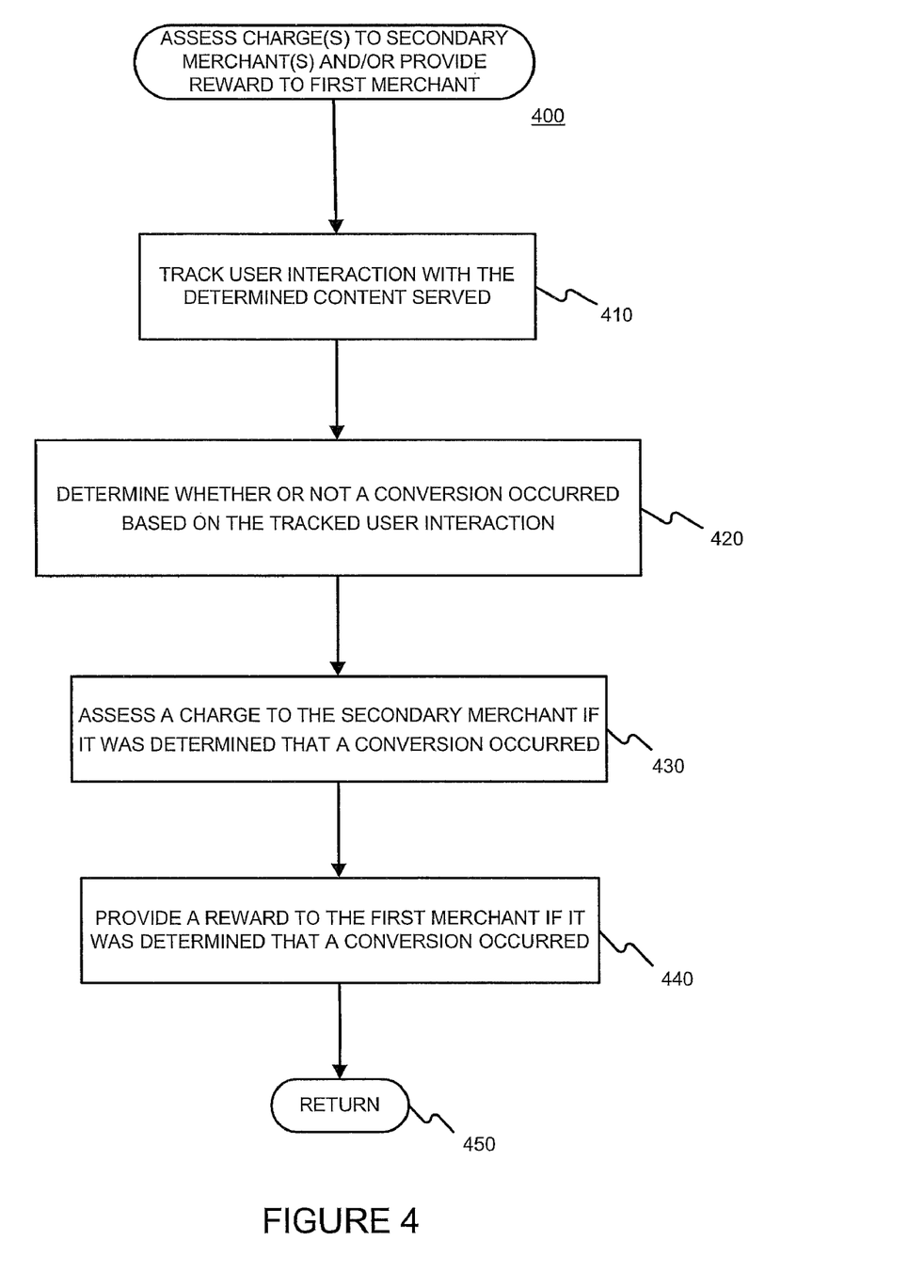

FIG. 4 is a flow diagram illustrating an exemplary method 400 for assessing charges and providing rewards in a manner consistent with the present invention. User interaction with the determined content served is tracked. (Block 410) "User interaction" may be any measurable and/or observable user action. Such user interaction may be logged and stored. Subsequently, the tracked user interaction information may be used to determine whether or not a conversion has occurred. (Block 420) As discussed in §4.1 above, a "conversion" may include a selection, a purchase, a registration, etc.

If it is determined that a conversion has occurred, then a charge is assessed to the secondary merchant associated with the converted content. (Block 430) In addition, if it is determined that a conversion has occurred, then a reward is provided to the first merchant. (Block 440) The method 400 is then left. (Node 450) In this exemplary method, if it is determined that a conversion (or a conversion of a specified type) has not occurred, then no charge is assessed to the secondary merchant and no reward is provided is to the first merchant. Alternatively, tiered levels of charges might be assessed and rewards might be provided for different types of conversions. Alternatively or in addition, charges might be assessed and rewards might be provided even if no conversion occurs, and supplemented if a conversion occurs.

Thus, compensation schemes for secondary product content might be similar to those of online advertising networks. In some online advertising networks, an advertiser typically compensates the content owner (referred to more generally as a "document publisher" or "Web publisher") and perhaps an ad serving entity. Such compensation may occur whenever the ad is served (per impression), or may be subject to a condition precedent such as a selection, a conversion, etc. Compensation per selection (commonly referred to as "pay per click") is currently popular. As an example, each time a user selects an ad, they are typically brought to (e.g., their browser loads) a corresponding landing page linked from the ad. The advertiser compensates the Web publisher for the selection. In conjunction with the "pay per click" technique, advertisers bid on keywords or categories that they believe will improve their opportunity to target their ads to a receptive audience. This enables advertisers to have their advertisements displayed alongside the results of the Internet searches that may be relevant to a current user interest (e.g., relevant to a user's search query to a search engine, relevant to content in a document requested by the user, etc.). These ads are known as "sponsored ads or links". Generally, the advertiser pays only when the consumer clicks on their particular ad. Thus, in some embodiments consistent with the present invention, the secondary merchant might be assessed charges like an online advertiser and might bid on keywords or concepts found in the first (primary) product document, while the primary merchant might be compensated like a Web publisher.

Figure 5:
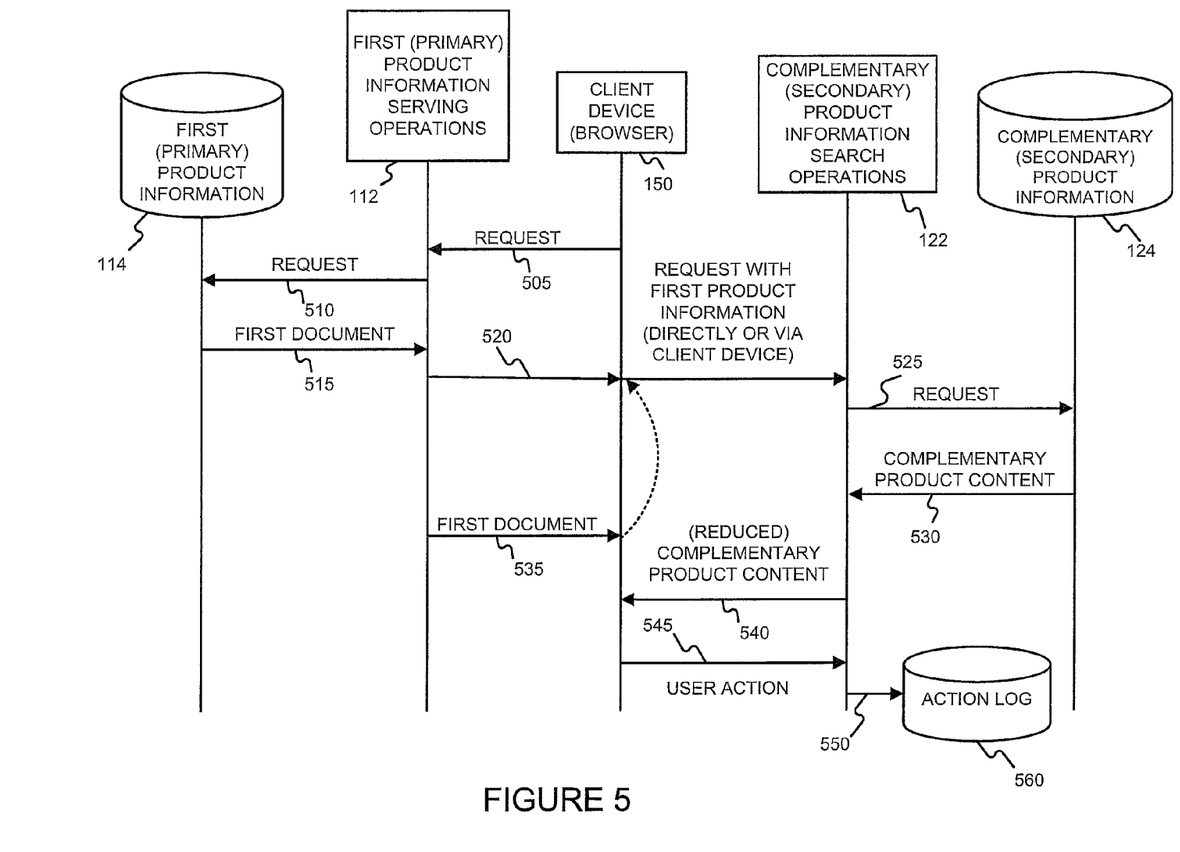
FIG. 5 is a messaging diagram illustrating an exemplary communications for determining and providing complementary product (and/or service) content, in a manner consistent with the present invention.

FIG. 5 is a messaging diagram illustrating exemplary communications used when determining and providing complementary product information in a manner consistent with the present invention. The user initiates a request 505 for first product information via the client device (e.g., browser) 150. The request 505 is provided to the first (primary) product information serving operations 112. As indicated by communications 510 and 515, the first (primary) product information serving operations 112 retrieve the first product content (first document, such as a Web page) from the first (primary) product information 114 stored for the first merchant. As discussed above, the first document may be a product information document, a check-out document, a post check-out document, etc. Examples of post check-out documents include (A) an order confirmation document, (B) a shipping confirmation document, (C) an order status document and (D) a charge confirmation document. The first document may also be a merchant service information document (e.g., transaction processing information).

As should be appreciated from the foregoing, the first document 515 might only be indirectly related to the request 505. For example, the request 505 might be a checkout request, and the first document might be a shipping confirmation.

The first (primary) product information serving operations 112 then forward a request for complementary product information 520, which may include first product information (from the first document), to the complementary (secondary) product information search operations 122. The request 520 might be directly communicated to the complementary (secondary) product information search operations 122, or might be indirectly communicated, via the client device 150. For example, in the latter case, the request or code for generating the request might be encoded in the product page 535, in which case the request for complementary product content might be generated when a browser on the client device 150 opens the product page 535 and executes code (e.g., JavaScript) for generating the request.

The complementary (secondary) product information search operations 122 use the first product information, provided in the request 520, to search for complementary product information. For example, a Website (e.g., Froogle™) might determine if there is complementary product content available that relates to the first product. The complementary (secondary) product information search operations 122 uses the first product information (or a derivative thereof) in a request 525, and complementary (secondary) product content 530 from complementary product information 124 is returned. The secondary product is different from the first product, and is offered for sale by a secondary merchant who is different from the first merchant. In some embodiments consistent with the present invention, the complementary (secondary) product information search operations 122 may determine information about a plurality of complementary (secondary) products for one or more secondary merchants.

In such instances, there may be more complementary product content 530 than the first document can accept. For example, if the complementary product content 530 is advertisements, the first document might have a limited number of ad spots. In such a case, some complementary product content must be chosen to the exclusion of other complementary product content. In such a case, the complementary (secondary) product information server 120 might may accept a plurality of product content pertaining to secondary products offered for sale by one or more secondary merchants, and may then determine scores for each of the plurality of secondary product content. There are various factors that might be used in determining a score. Such factors might include one or more of: relevance of the secondary product to the first product, compensation amount offered by the secondary merchant offering the secondary product for sale, likelihood of receiving the compensation if the complementary product content is provided (e.g., selection rate associated with the secondary product content, conversion rate associated with the secondary product content, expected selection rate (e.g., based at least on part on user behavior, user purchase history, performance on similar documents, etc.), expected conversion rate (e.g., based at least in part on user behavior, user purchase history, performance on similar documents, etc.), etc.), amount of content about the secondary product, quality of content about the secondary product, whether or not the first merchant sells the secondary product or a competing product, whether or not the first merchant has the secondary product or a competing product available in inventory, whether or not the first merchant is able to ship the secondary product or a competing product at the present time or within a predetermined time, whether or not the secondary merchant competes with the first merchant (e.g., identified as a competitor to be blocked by the first merchant), whether or not the secondary product competes with the first product (e.g., and identified to be blocked by the first merchant), etc. The complementary product information server 120 may determine whether or not to serve, and/or how to serve, the secondary product content using the respective scores obtained. In addition to or instead of being used for scoring the complementary product content, the forgoing factors may be used to filter (e.g., value of factor is applied to a threshold) the complementary product content.

Referring back to the first (primary) product information serving operations 112, the first document 535 (pertaining to the first product) retrieved from the first (primary) product information 114 is returned to the client device 150. Further, one or more of the (scored) complementary (secondary) product content 540 served by the complementary (secondary) product information server 120 is returned to the client device 150. Thus, the first document 535 and one or more of the (scored) complementary (secondary) product content 540 are both provided to the client device 150 to be rendered to the user in association with each other.

In some embodiments consistent with the present invention (Recall, e.g., FIG. 4.), the user's action in response to the complementary (secondary) product content provided is measured and/or tracked to determine if a selection or conversion has occurred. This information 550 may be forwarded to the complementary (secondary) product information server 120 and stored in a user action log 560. The action log information 560 may be used later for determining compensation to be provided to the first merchant and fees to be assessed to the one or more secondary merchants.

Figure 6:
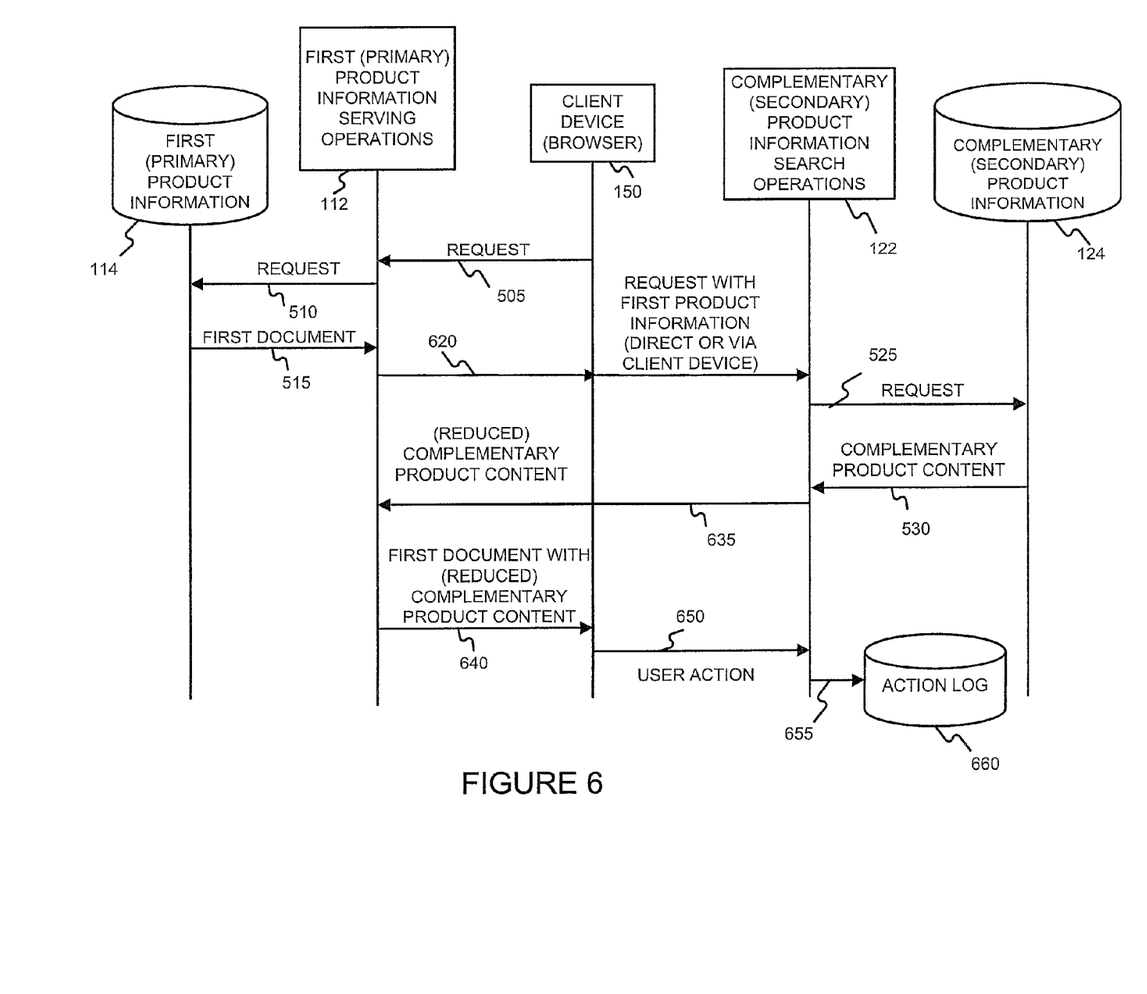
FIG. 6 is a messaging diagram illustrating an exemplary communications for determining and providing complementary product (and/or service) content, in a manner consistent with the present invention.

FIG. 6 is a messaging diagram illustrating exemplary communications for determining and providing complementary (secondary) information in a manner consistent with the present invention. FIG. 6 has some similarities to FIG. 5, and communications 505,510, and 515 correspond to those discussed above with reference to FIG. 5. That is, the user initiates a request 505 for first product information via the client device (e.g., browser) 150. The request 505 is provided to the first (primary) product information serving operations 112. As indicated by communications 510 and 515, the first (primary) product information serving operations 112 retrieves the first product content (first document, such as a Web page) from the first (primary) product information 114 stored for the first merchant.

The first (primary) product information serving operations 112 then forward a request for complementary product information 620, which may include first product information (from the first document), to the complementary (secondary) product information search operations 122. The request 620 might be directly communicated to the complementary (secondary) product information search operations 122. Alternatively, the request 620 might be indirectly communicated, via the client device 150 (e.g., as discussed above with reference to FIG. 5).

The complementary (secondary) product information search operations 122 uses the first product information (or a derivative thereof) in a request 525, and complementary (secondary) product content 530 is returned. The secondary product is different from the first product, and is offered for sale by a secondary merchant who is different from the first merchant. In some embodiments consistent with the present invention, the complementary (secondary) product information search operations 122 may determine information about a plurality of complementary (secondary) products for one or more secondary merchants.

The message diagram of FIG. 6 differs from that of FIG. 5 because the (reduced) complementary (secondary) product content 635 is provided to the first (primary) product information serving operations 112. These operations 112 combine the (reduced) complementary (secondary) product content 635 with the first document, and transmit the combined information 640 to the client device 150 where it is rendered to the user.

In some embodiments consistent with the present invention (Recall, e.g., FIG. 4.), the user's action in response to the complementary (secondary) product content provided is measured and/or tracked to determine if a selection or conversion has occurred. This information 655 may be forwarded to the complementary (secondary) product information server 120 and stored in a user action log 660. The action log information 660 may be used later for determining compensation to be provided to the first merchant and fees to be assessed to the one or more secondary merchants.

Figure 7:
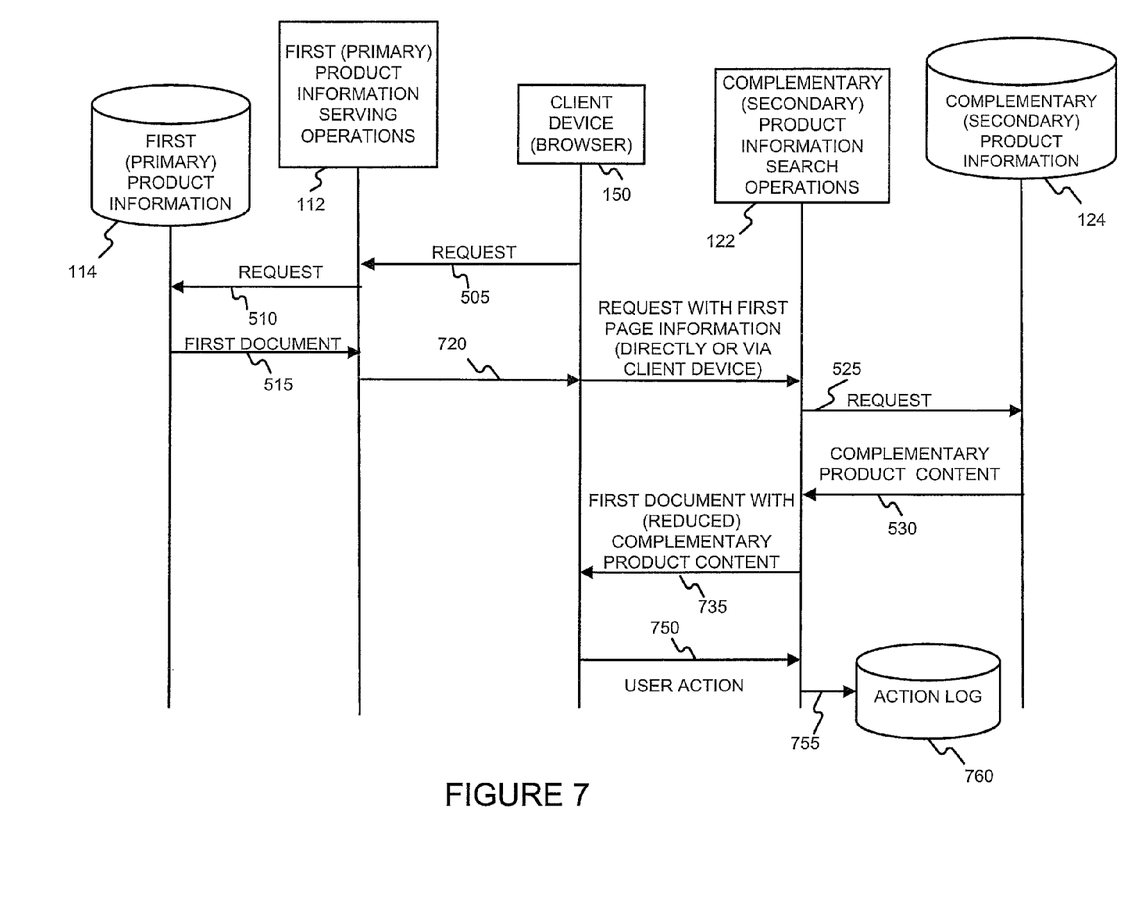
FIG. 7 is a messaging diagram illustrating exemplary communications for determining and providing complementary product complementary product (and/or service) content, in a manner consistent with the present invention.

FIG. 7 is a messaging diagram illustrating exemplary communications for determining and providing complementary (secondary) information in a manner consistent with the present invention. FIG. 7 has some similarities to FIG. 5, and communications 505,510, and 515 correspond to those discussed above with reference to FIG. 5. That is, the user initiates a request 505 for first product information via the client device (e.g., browser) 150. The request 505 is provided to the first (primary) product information serving operations 112. As indicated by communications 510 and 515, the first (primary) product information serving operations 112 retrieves the first product content (first document, such as a Web page) from the first (primary) product information 114 stored for the first merchant.

The first (primary) product information serving operations 112 then forward a request for complementary product information 720, which includes the first document, to the complementary (secondary) product information search operations 122. The request 720 might be directly communicated to the complementary (secondary) product information search operations 122. Alternatively, the request 720 might be indirectly communicated, via the client device 150 (e.g., as discussed above with reference to FIG. 5).

The complementary (secondary) product information search operations 122 uses the first product information (or a derivative thereof) in a request 525, and complementary (secondary) product content 530 is returned. The secondary product is different from the first product, and is offered for sale by a secondary merchant who is different from the first merchant. In some embodiments consistent with the present invention, the complementary (secondary) product information search operations 122 may determine information about a plurality of complementary (secondary) products for one or more secondary merchants.

The message diagram of FIG. 7 differs from that of FIGS. 5 and 6 because the complementary (secondary) product information server 120 transmits both the first document, together with the (reduced) complementary (secondary) product content 735, to the client device 150 where it is rendered to the user.

In some embodiments consistent with the present invention (Recall, e.g., FIG. 4.), the user's action in response to the complementary (secondary) product content provided is measured and/or tracked to determine if a selection or conversion has occurred. This information 755 may be forwarded to the complementary (secondary) product information server 120 and stored in a user action log 760. The action log information 760 may be used later for determining compensation to be provided to the first merchant and fees to be assessed to the one or more secondary merchants.

To summarize the foregoing, the first document may be transmitted to the client device 150 from the first (primary) product information serving operations 112, while the (reduced) complementary (secondary) product content is transmitted to the client device 150 from the complementary (secondary) product information server 120 as shown in FIG. 5. Alternatively, both the first document and the (reduced) complementary (secondary) product content may be transmitted to the client device 150 from the first (primary) product information serving operations 112 as shown in FIG. 6. In yet another alternative, both the first document and the (reduced) complementary (secondary) product content may be transmitted to the client device 150 from the complementary (secondary) product information server 120 as shown in FIG. 7.

Exemplary Apparatus

Figure 9:
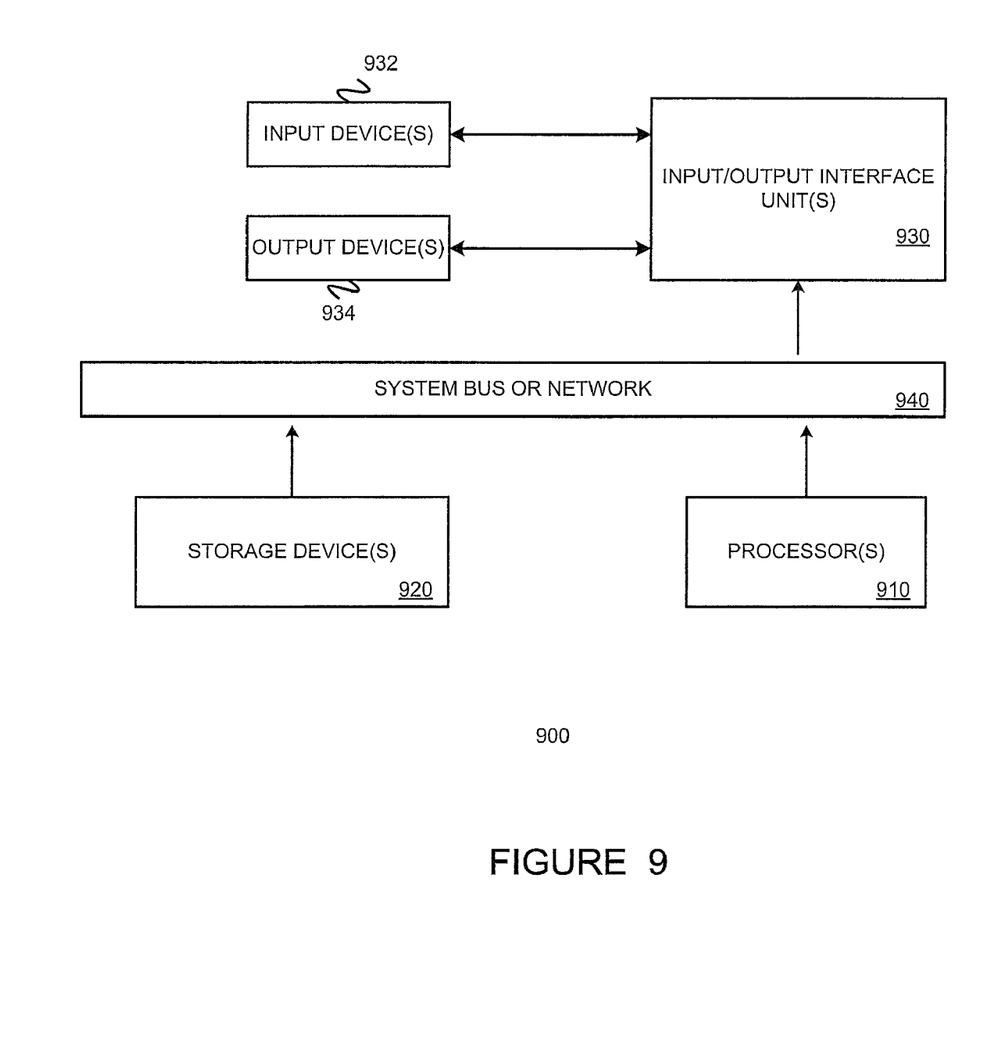
FIG. 9 is a block diagram of apparatus that might be used to perform at least some operations, and store at least some information, in a manner consistent with the present invention.

FIG. 9 is a block diagram of apparatus 900 that may be used to perform at least some operations, and store at least some information, in a manner consistent with the present invention. The apparatus 900 includes one or more processors 910, one or more input/output interface units 930, one or more storage devices 920, and one or more system buses and/or networks 940 for facilitating the communication of information among the coupled elements. One or more input devices 932 and one or more output devices 934 may be coupled with the one or more input/output interfaces 930.

The one or more processors 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. For example, one or more software modules, when executed by a processor, may be used to perform one or more of the operations and/or methods of FIGS. 2-4. At least a portion of the machine executable instructions may be stored (temporarily or more permanently) on the one or more storage devices 920 and/or may be received from an external source via one or more input interface units 930.

In one embodiment, the machine 900 may be one or more conventional personal computers or servers. In this case, the processing units 910 may be one or more microprocessors. The bus 940 may include a system bus. The storage devices 920 may include system memory, such as read only memory (ROM) and/or random access memory (RAM). The storage devices 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output devices 934 may include a monitor or other type of display device, which may also be connected to the system bus 940 via an appropriate interface. In addition to (or instead of) the monitor, the personal computer may include other (peripheral) output devices (not shown), such as speakers and printers for example.

The operations described above may be performed on one or more computers. Such computers may communicate with each other via one or more networks, such as the Internet for example. Referring back to FIG. 1 for example, the various operations and information may be embodied by one or more machines 910.

Refinements, Alternatives and Extensions

In the foregoing examples, information, documents and content about products and complementary products was discussed. Embodiments consistent with the present invention may use information, documents and content about services and complementary services instead, or in addition.

In some embodiments consistent with the present invention, the complementary product content provided may include a product image (e.g., thumbnail, digital photo, etc.), a product price, and an identification or method of identification for the second merchant. Naturally, there may be alternative types of the complementary product content provided, in addition to, or instead of, the product image and product price.

There may be different compensation and fee structures associated with different merchants. For example, different secondary merchants might specify different offers for different types of actions. In addition, merchants may have different fees and compensation agreements for different products, different product categories, etc. For example, a merchant might be willing to pay $0.25 per impression for an advertisement for an extended computer service warrantee for the product "laptop" and might be willing to pay $1.00 per conversion for an advertisement for a flash drive for the category "electronics".

Examples of Complementary Product Content Operations in an Exemplary Embodiment Consistent with the Present Invention The following are illustrative examples of determining and providing complementary product information in embodiments consistent with the present invention. They are not intended to be exhaustive or to limit the present invention to the precise method or particular values disclosed.

Exemplary Product Page and Complementary Product Content

Figure 8A:
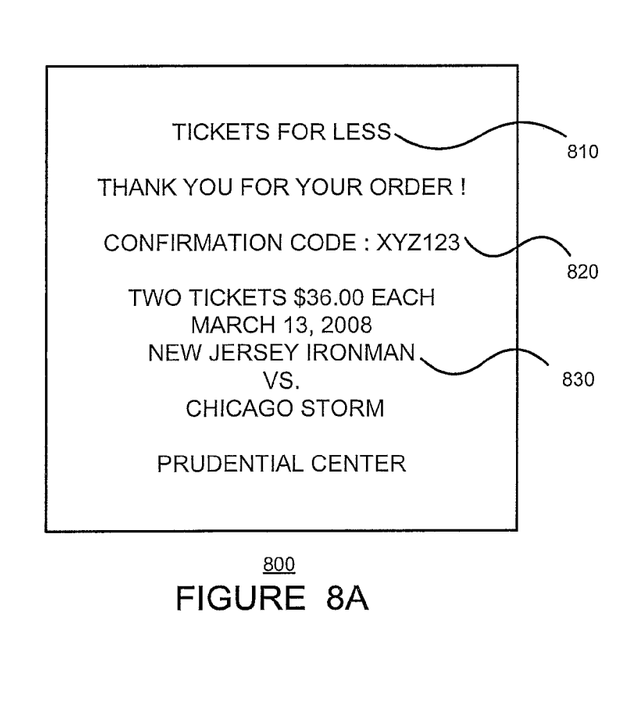
FIGS. 8A and 8B are examples of a primary product document and complementary product content, respectively, consistent with the present invention.

This example will first illustrate a sample first document (which is a product page), as well as determined complementary product content (which is an advertisement) to be served in association with the first document. Specifically, FIG. 8A shows an example of a first document 800 from a first merchant. In this example, the first document 800 a product page, and more particularly, is a post check-out order confirmation from a first merchant 810. The first document 800 describes a specified number of tickets to a soccer event to be held at a predetermined time and stadium location 830, and includes a confirmation code 820. The first merchant 8 10 is identified as "Tickets For Less", followed by a message related to the first document (e.g., "Thank you for your order!"). This is followed by the confirmation code 820 confirming that the transaction is complete. The text message 830 describes the details of the confirmed transaction. For example, "Two soccer tickets for $36.00 (each) to New Jersey Ironman vs. Chicago Storm on Mar. 13, 2008 at the Prudential Center".

Figure 8B:
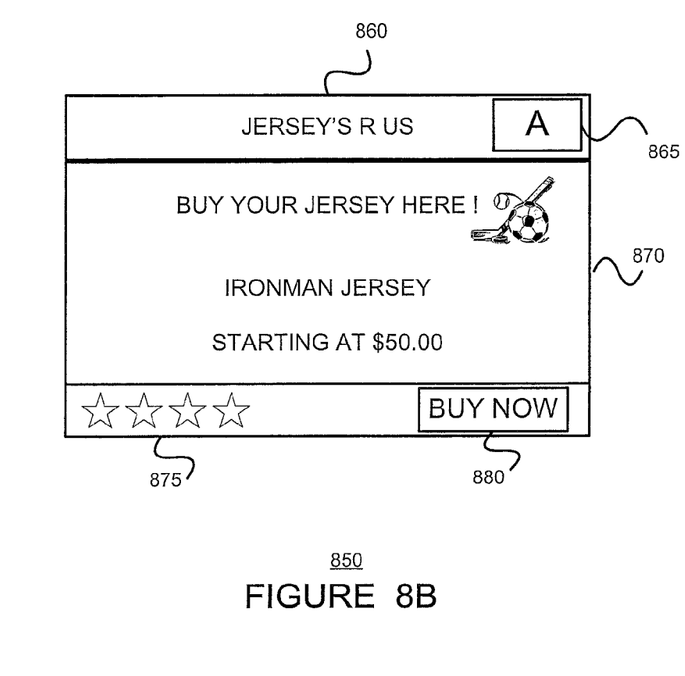

FIG. 8B shows an example in which complementary product content, determined using the product page 800 information, is an advertisement 850. A secondary merchant 860 is identified as "Jersey's R Us". Indicia 865 identifies the secondary merchant 860 and serves as a mark of quality and/or trustworthiness. In this example, the indicia is a stylized "A". The content 870 is an advertisement creative, and includes the message "Buy Your Jersey Here! Ironman Jersey starting at $50.00". A reputation score 875 for the second merchant 860 is displayed. This is followed by a selectable text button 880. The "Buy Now" text urges the user to take action, and may provide an embedded link to another Web page (e.g., the complementary product Website).

Ultimately, both the product page 800 pertaining to the first product (e.g., the order confirmation for the soccer tickets) and the determined complementary product content 850 (e.g., the e-commerce enable ads for soccer jerseys) are provided to the client device (e.g., browser) for rendering to an end user. One of the methods described above with reference to FIGS. 5-7 may be used to communicate the first product information and the complementary product information content to the client device.

Exemplary Methods for Determining and Serving Complementary Product Content

This example will now illustrate an exemplary method for determining complementary product content 850 from information of the product page 800 in a manner consistent with the present invention. Referring back to FIG. 5, assume that information from the product page 800 is accepted from a client device. Recall from FIG. 8A, that the product page 800 is a post check-out order confirmation from a first merchant 810 including a confirmation code 820 and first product information 830.

Referring back to communications 520 of FIG. 5, information of the product page 800 is forwarded a complementary product information search operations 122. Examples of product information that may extracted from the product page 800 might include the terms "soccer", "tickets", "soccer tickets", "Prudential Center", "Mar. 13, 2008," etc. Using this extracted product information, stored complementary (secondary) product information 124 is searched to determine if there is any relevant complementary product content available.

The complementary product information server 120 may determine a plurality of pieces of complementary product content offered by one or more secondary merchants. The determined content will be from a secondary merchant different from the first merchant, and will be for a product different from the first product. Examples of complementary product (and service) content that could be retrieved might include ads for soccer jerseys, soccer cleats, soccer equipment, restaurants near the stadium, a local limousine service, etc. The content might be an e-commerce enabled advertisement. In the exemplary ad 850, the complementary product content provided includes an image, a product price and an identification of the secondary merchant.

In this example, the complementary product information server 120 determines scores for the complementary product content retrieved. Scores may be determined for each of the plurality of pieces of complementary product content from the one or more secondary merchants. Scoring may be dependent on various factors such as, for example, conversion rate associated with the complementary product content, offer per conversion associated with the complementary product content, relevance of the complementary product content to the first document 800 (or information extracted or otherwise derived therefrom, etc.). Alternatively or in addition to, other factors that may determine scores may be a function of one or more of (A) whether or not the first merchant sells the complementary product, (B) whether or not the first merchant has the complementary product available in inventory, and (C) whether or not the first merchant is able to ship or otherwise provide the complementary product at the present time or within some predetermined time.

The complementary product information server 120 then determines whether or not and how to serve the content pertaining to the plurality of pieces of complementary product information.

The product page 800 pertaining to the first product (i.e., the order confirmation for the soccer tickets) and one or more of the determined (scored) complementary product content (i.e., the e-commerce enable ads for soccer jerseys) 850 are served to the client device (e.g., browser) 150 and combined. For example, the order confirmation for the soccer tickets 800 is combined with one or more e-commerce enable advertisement 850 for soccer jerseys and displayed to the user via the browser.

In this example, the user's action's in response to the complementary product content 850 is tracked in order to determine if a selection or conversion has occurred and stored in the conversion log. The conversion log information may be used to determine compensation paid to the first merchant and fees to be assessed to the secondary merchant(s).

Conclusions

When purchasing a product or service from an online merchant ("first merchant"), e-commerce consumers might want to purchase a complementary product and/or service not offered by the first merchant. Embodiments consistent with the present invention (1) provide such consumers with an opportunity to purchase or otherwise learn about such complementary products and/or services, and (2) provide secondary merchants with the opportunity to sell or market such complimentary products and/or services in a way that would not jeopardize the first merchant's sale, and indeed, in a way that might provide a benefit to the first merchant.

What is claimed is:

1. A computer-implemented method comprising:
   accepting, into a memory, a first document of a first merchant pertaining to a first product, wherein the first document is one of a check-out document and a post check-out document;
   determining, with a processor, using information from the accepted first document, content pertaining to a second product from a second merchant different from the first merchant, based on whether at least one of the second product and the second merchant is identified as competing by the first merchant; and
   serving the determined content for rendering in association with the first document on a client device.

2. The computer-implemented method of claim 1 wherein the first document is one of an order confirmation document, a shipping confirmation document, an order status document, and a charge confirmation document.

3. The computer-implemented method of claim 1 further comprising:
   assessing a charge to the second merchant for serving the determined content; and
   providing a reward to the first merchant for serving the determined content.

4. The computer-implemented method of claim 1 further comprising:
   tracking user interaction with the determined content served;

determining whether or not a conversion occurred based on the tracked user interaction;

assessing a charge to the second merchant if it was determined that a conversion occurred; and providing a reward to the first merchant if it was determined that a conversion occurred.

5. The computer-implemented method of claim 1 wherein the act of determining content pertaining to a second product from a second merchant different from the first merchant includes:

i) extracting information about the first product from the first document; and     ii) determining searches related to searches for the first product from a product search Website.

6. The computer-implemented method of claim 1 wherein the act of determining content pertaining to a second product from a second merchant different from the first merchant includes:

i) extracting information about the first product from the first document; and     ii) determining related products from product vertical categories.

7. The computer-implemented method of claim 1 wherein the act of determining content pertaining to a second product from a second merchant different from the first merchant includes:

i) extracting information about the first product from the first document; and     ii) determining related products from advertiser ads.

8. The computer-implemented method of claim 1 wherein the act of determining content pertaining to a second product from a second merchant different from the first merchant includes:

i) accepting information related to a plurality of products from a plurality of merchants;

ii) determining scores for each of the plurality of products from a plurality of merchants;

iii) determining whether and how to serve content pertaining to the plurality of products from the plurality of merchants based on the scores.

9. The computer-implemented method of claim 8 wherein each of the scores is a function of a conversion rate of content associated with the product.

10. The computer-implemented method of claim 8 wherein each of the scores is a function of an offer per conversion associated with the content associated with the product.

11. An apparatus comprising:

one or more processors;

at least one input device;

at least one output device; and one or more storage devices storing processor-executable instructions which, when executed by one or more processors, perform a method of accepting a first document of a first merchant pertaining to a first product, wherein the first document is one of a check-out document and a post check-out document;

determining, using information from the accepted first document, content pertaining to a second product from a second merchant different from the first merchant, based on whether at least one of the second product and the second merchant is identified as competing by the first merchant; and serving the determined content for rendering in association with the first document on a client device.

* * * * *